United States Patent [19]

Balestrieri et al.

[11] Patent Number: 5,053,232

[45] Date of Patent: Oct. 1, 1991

[54] PROTEIC INHIBITOR OF PECTINESTERASE AND USE THEREOF IN THE PREPARATION OF FRUIT AND VEGETABLE JUICES

[75] Inventors: Ciro Balestrieri; Luigi Servillo; Lucio Quagiuolo; Alfonso Giovane, all of Naples; Domenico Castaldo, Nola, all of Italy

[73] Assignee: Stazione Sperimentale per l'Industria delle Conserve Alimentari, Parma, Italy

[21] Appl. No.: 521,446

[22] Filed: May 10, 1990

[30] Foreign Application Priority Data

May 16, 1989 [IT] Italy .................................. 47961 A/89

[51] Int. Cl.$^5$ .......................... A23B 7/00; A23L 1/212
[52] U.S. Cl. ......................................... 426/49; 426/51; 426/330.5; 530/370; 530/395
[58] Field of Search ..................... 426/49, 51, 52, 61, 426/63, 271, 330.5, 599; 530/370, 395, 397, 412, 416, 417, 420

[56] References Cited

U.S. PATENT DOCUMENTS

| | | | |
|---|---|---|---|
| 3,676,149 | 7/1972 | Fennell | 530/370 |
| 3,682,880 | 8/1972 | Brouwer | 530/370 |
| 3,817,834 | 6/1974 | Wilson | 530/370 |
| 3,826,795 | 7/1974 | Essiet | 530/395 |
| 3,998,798 | 12/1976 | Cagan | 530/370 |
| 4,011,206 | 3/1977 | Higginbothana | 530/370 |
| 4,233,210 | 11/1980 | Koch | 530/370 |
| 4,981,708 | 1/1991 | McEerly | 426/262 |

FOREIGN PATENT DOCUMENTS 0351566  1/1990  European Pat. Off. ............ 530/370

OTHER PUBLICATIONS

Chemical Abstracts 113(21) 187119n.
Cehmical Abstracts 97(15)124077c.
Chemical Abstracts 94(17)138018j.
Hagerman 1986 J. Agric Food Chem 34:440.
Kertesz 1955 Method in Enzymol. vol. 1, p. 158.

*Primary Examiner*—Carolyn Paden
*Attorney, Agent, or Firm*—Samuels, Gauthier & Stevens

[57] ABSTRACT

A proteic inhibitor of the pectinesterase enzyme has been extracted from fruit, in particular from the kiwi (Actinidia chinensis). The inhibitor is constituted by a single polypeptide chain, having a molecular weight of 28,000 daltons and an isoelectric point not higher than 3.5. The pectinesterase inhibitor may be used as an adjuvant for stabilizing vegetable juices and concentrates.

9 Claims, 1 Drawing Sheet

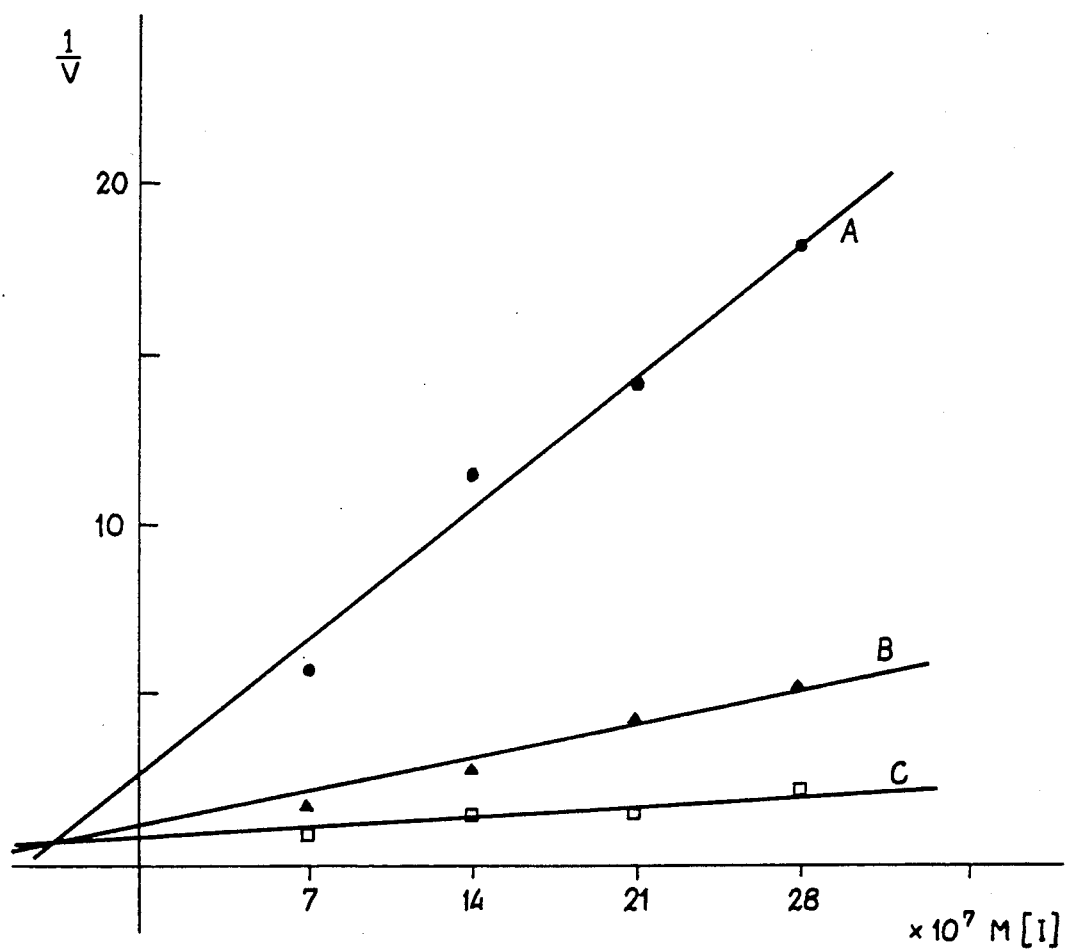

PROTEIC INHIBITOR OF PECTINESTERASE AND USE THEREOF IN THE PREPARATION OF FRUIT AND VEGETABLE JUICES

FIELD OF THE INVENTION

The present invention concerns a proteic inhibitor of pectinesterase and the use thereof in the preparation of fruit and vegetable juices. More particularly, this invention relates to a proteic substance capable of inhibiting the activity of the pectinesterase enzyme (PE), which has been discovered in the kiwi (Actinidichinensis) and has been extracted and purified therefrom. It is proposed to employ such a substance as an adjuvant for stabilizing vegetable juices and concentrates.

DESCRIPTION OF THE RELATED ART

As it is known, fluid food products, and particularly vegetable juices, can be considered as heterogeneous mixtures made of a serum and a dispersed phase. The serum contains mainly acids, carbohydrates, soluble proteins and aminoacids, while the dispersed phase is essentially made of cell aggregates and cell wall fragments.

In the vegetable cell walls there can be found, as main structural constituents, the pectic substances, or pectins, which are made of polysaccharidic chains related to pectic acid. Pectic acid is formed by galacturonic acid units bound to each other essentially by $-1,4$ bonds. The carboxy groups of pectic acid may be either esterified or in the salt form, and other carbohydrates may be present in the chain.

In general, pectins may be classified in three different groups based on their solubility in water: soluble pectins, pectates and protopectins.

Soluble pectins are extracted from the vegetable tissue with water, and have a high esterification degree (the esterifying groups are generally methoxy groups). Pectates have a low esterification degree and are insoluble in presence of bivalent cations, while they become soluble if a chelating agent is present, such as ammonium oxalate or sodium esametaphosphate. Protopectins are solubilized only upon heating in presence of an acid or a base.

In the production of fruit juices (e.g. orange juice) a suspension made of cell fragments together with water soluble pectic fractions is a desirable feature, usually called "body". When such feature is absent, the juice is referred to as "thin". More generally, the whole technology of vegetable juices and concentrates is intended to obtaining products whose turbidity ("cloud", in the specialistic terminology) is stable, and which are not subject to clarification, sedimentation or flocculation.

The destabilization of the "cloud" of an orange juice is mainly caused by the modifications brought about by some enzymes, among which, first of all, pectinesterase. Clarification of a juice (e.g. orange juice) occurs when native PE, by lowering the esterification degree of soluble pectins, makes the latter precipitate as insoluble pectates.

If the level of pectin is very high, as in the concentrates, the above-mentioned pectates give rise to gels. Both pectins and pectates are known to form gelatinous masses in suitable conditions. In general, two different kinds of gels may be distinguished: gels of carbohydrates, acids and pectins, which are formed at carbohydrate concentrations higher than 65%, at low pH and in presence of highly esterified pectins, and pectate gels, which are formed in the presence of poorly esterified pectins and bivalent cations.

Gelification of the concentrates negatively affects the quality of the product, as it hampers the reconstitution of the cloud.

Gelification represented a major problem in the U.S.A. in the years immediately following World War 11, when for the first time frozen concentrate orange juices (FCOJ) were produced. These juices were not pasteurized.

FCOJ had a concentration of 60-65° Brix, and when it was not kept as frozen but at a temperature from $-9°$ (15.8° F.) to $-5°$ (23° F.) it rapidly developed low esterified pectins, due to the PE activity in the concentrate. Soluble pectins gradually decreased, while insoluble pectates increased.

The above-mentioned type of manufacture was dismissed, and now FCOJ is produced by concentrating pasteurized juice (which, however, looses most of its flavors in this process) up to about 65° Brix (orange juice) or to 40° Brix (lemon juice), and by immediately cooling the resulting concentrate to about $-9°$ (15.8° F.).

Pasteurization is intended to allow, in one only process, to sterilize the juice, as it should destroy the microorganisms commonly present in the juice, and to stabilize it, as it should inactivate the enzymes contained, particularly pectinesterase. However, it is necessary that, at the same time, such heat treatment be such as not to alter the nutritional and organoleptic properties of the juice. Moreover, the pasteurization process should not be excessively costly.

Considering that the heat resistance of PE is much higher than the inhibition temperature of the ordinary microbial flora of the fruit juices, it becomes evident that the stabilization by heat treatment is not convenient both as far as energy consumption is concerned and as far as the organoleptic properties of the final product are concerned.

Another process for manufacturing FCOJ, directed to reducing the above-mentioned drawbacks, comprises admixing pasteurized concentrate juice with non-pasteurized juice (rich in flavors but also in PE activity) so as to lower the concentration to 45° Brix (orange juice) or to 30° Brix (lemon juice). These products, called cut-back juices, are then rapidly frozen at a temperature of $-18°$ C. ( 0° F.).

The cut-back technology has given rise to products of good organoleptic properties but, at the same time, has introduced additional costs that cannot be disregarded, such as, for instance, the costs connected to storing the product at temperatures not higher than $-18°$ C. (0° F.). Such low temperature is necessary for obtaining the inhibition of the PE activity.

The problems referred to above with reference to citrus juices extend to the production of all vegetable juices and concentrates. As far as tomato juice is concerned, for instance, in order to obtain products of good stability, consistency and taste it is necessary to apply complex and energetically costly technologies, such as those known as hot-break processes.

Summarizing, it may be said that the manufacturing technique of both clear and turbid vegetable juices is strictly dependent on the chemistry of the pectic substances and of the PE enzyme, and on the advances in the relevant knowledge and technologies.

SUMMARY OF THE INVENTION

The object of the present invention is, therefore, to overcome the drawbacks resulting from the PE activity in vegetable juices and concentrates. Upon a thorough study of the ways in which the PE activity develops in nature a new method for reducing or inhibiting said activity has been arrived at.

Starting from the observation that PE, by acting on the cell wall pectins, plays a major role in the growth of the vegetable cell, the possible mechanisms of enzyme modulation have been investigated. These mechanisms give rise to the different stages in the plant tissue growth.

In examining the kiwi fruit (Actinidia chinensis) at various stages of ripening, a proteic substance has been detected which is capable of inhibiting the PE activity not only in the kiwi, but in any vegetable or microbial substrate. The inhibitor, called PEI (or, more precisely, PMEI, pectin methylesterase inhibitor), has been found to be active on PE coming from any source and is, therefore, not species-specific.

PEI may be added, therefore, to any vegetable product in order to inhibit or reduce the PE activity, thus contributing considerably to the stability and cloud retention of juices and concentrates.

Accordingly, the present invention provides a protein having pectinesterase-inhibiting activity, extracted from fruit, made of a single polypeptide chain having molecular weight of 28,000 daltons.

In particular, said protein has been extracted and purified from kiwi, but it is not excluded that it may be obtained from other fruits or else produced by microbial strains, possibly transformed.

DESCRIPTION OF THE PREFERRED EMBODIMENTS

As a further feature, the inhibitor of the present invention is an acidic protein, having an isoelectric point higher than 3.5.

The extraction and purification of PEI may be summarized as follows:

1) Extraction from the biological source (kiwi):

After having been peeled, the fruits are homogenized in water in a ratio of 1:1 w/v. The homogenate is centrifuged and the supernatant is collected.

2) Fractioned precipitation

Ammonium sulfate is added to the supernatant, up to 25% of saturation, then the mixture is centrifuged and the supernatant is collected. Ammonium sulfate is added to the supernatant, up to 70% of saturation. The precipitate so obtained is re-dissolved in tris-HCl buffer 20 mM, pH 7.5, 20 mM NaCl, and exhaustively dialized against the same buffer.

3) Anionic exchange chromatography

The proteic solution obtained from dialysis is applied on a column containing an anionic exchange resin (Q-sepharose) and eluted with a linear gradient of NaCl from 20 mM to 400 mM. The PEI-containing fractions are combined and concentrated by precipitation with ammonium sulphate; then, they are dialized as in step 2.

4) FPLC (Fast Protein Liquid Chromatography) The dialysate from step 3 is subject to chromatography in a FPLC system equipped with a mono-Q column, with a linear gradient from 20 to 500 mM NaCl. The PEI-containing fractions are about 90% pure.

Accordingly, the invention further provides a protein having pectinesterase-inhibiting activity as defined by the process by which it is obtainable, said process being as follows: homogenization in water of the kiwi pulp, centrifugation and separation of the supernatant, fractioned precipitation of the so obtained supernatant with ammonium sulfate (0–70% saturation), re-dissolution of the so obtained precipitate and dialysis thereof, fractioning by anionic exchange chromatography of the proteic dialysate obtained from the preceding step and collection of the fractions showing PE-inhibiting activity, concentration of the mixture obtained by combining said fractions by precipation with ammonium sulfate and subsequent dialysis, further purification of the dialysate by FPLC.

In the experiments conducted in connection with the present invention the PE activity has been determined in the pH range between 7.0 and 8.0 by the spectrofotometric method of Hagerman and Austin (J. Agric. Food Chem., 1986, 34, 440–444), while the same determination at pH lower than 7 has been made according to the titrimetric method of Kersetz (Methods in Enzymol. 1955, 1, 158–162).

The presence of the PE-inhibiting protein in the above-mentioned eluted fractions has been determined by adding prefixed volumes of such fractions in PE solutions having a known activity, and by detecting, by the same assays as above, the resulting reduction (or disappearance) of the PE activity.

The molecular weight of PEI has been determined by electrophoresis on polyacrilamide gel (SDS-PAGE), by gel-filtration in native conditions and by analytical ultracentrifugation in native conditions. In all cases the measured molecular weight was 28,000 daltons.

The proteic nature of the inhibitor of the present invention has been confirmed by a series of experimental tests. First of all, it has been found that by treating PEI solutions with the proteolytic enzyme trypsin (followed by inhibition of trypsin itself before the contact with PE) the inhibitory activity of pectinesterase is reduced to zero.

Secondly, it has been ascertained that PEI solutions give a positive reaction with the colorimetric reactants typical for proteins (e.g. coomassie, Lowry, biuret).

Lastly, it has been found that the activity of PEI is lost if the inhibitor is heated to at least 85° C. (185° F.) for more than 5 minutes. It is however to be noted that, notwithstanding its proteic nature, PEI shows a quite good resistance to heat.

The inhibiting activity of PEI has been determined, by applying the methods referred to before, both on the purified PE enzyme and on various fruit and orange juices showing PE activity.

In both cases the inhibiting activity remains inaltered in the whole pH range from 3,5 to 8. In the various juices tested the PE activity progressively decreases as the amount of PEI added decreases, up to complete disappearance.

The enclosed figure shows the Dixon diagram for the determination of the inhibition constant of PEI. Said diagram shows the inverse of the initial reaction velocity as a function of the inhibitor concentration for three series of tests on orange pectin solutions, containing, respectively, 0,1%, 0,2% and 0,3% pectin (A, B and C). The pH value was 7.5 in all cases. The inhibition turned out to be of the competitive type and the inhibition constant was $3.5 \cdot 10^{-7}$ M.

Thereafter, binding tests, conducted electrophoretically on solutions containing both the enzyme and its inhibitor, showed the formation of an enzyme-inhibitor complex.

In order to evaluate the PEI ability to stabilize orange juice, cut-back samples at 42° Brix were prepared containing different amounts of non-pasteurized juice (from 6.6 to 38%). The samples were prepared by mixing 60° Brix concentrate with 12° Brix fresh orange juice, which had been previously depulped by filtration.

The PE activity was found to be 0.84 U/ml in the fresh juice, while no activity was detected in the pasteurized concentrate. Each sample, at a specific concentration of fresh juice, was divided in three aliquots and treated as follows: samples labeled P: pasteurized at 100° C. (212° F.) for 7 minutes samples labeled NP: not pasteurized samples labeled I: added with a PEI amount which completely inhibited the PE activity.

Thereafter, the samples were added with 2000 ppm benzoic acid and 1000 ppm sulfur dioxide, and they were stored in sealed tubes at 5° C. (41° F.).

The residual PE activity was then measured and the values detected are shown in the following table.

TABLE 1

PME residual activity in "Cut-Back" juices (42° Brix) stored at 5° C.

| Sample | % of fresh juice added | PME activity (U/mL) time = 0 | PME activity (U/mL) time = 240 days |
|---|---|---|---|
| 1P |  | 0 | 0 |
| 1NP | 6.6 | $5 \times 10^{-2}$ | 0 |
| 1I |  | 0 | 0 |
| 2P |  | 0 | 0 |
| 2NP | 10 | $8 \times 10^{-2}$ | trace |
| 2I |  | 0 | 0 |
| 3P |  | 0 | 0 |
| 3NP | 20 | $17 \times 10^{-2}$ | trace |
| 3I |  | 0 | 0 |
| 4P |  | 0 | 0 |
| 4NP | 30 | $34 \times 10^{-2}$ | trace |
| 4I |  | 0 | 0 |
| 5P |  | 0 | 0 |
| 5NP | 38 | $43 \times 10^{-2}$ | $15 \times 10^{-4}$ |
| 5I |  | 0 | 0 |

From table 1 it clearly appears that: i) there is no detectable PE activity in the pasteurized juices; ii) PE activity in juices not subject to pasteurization after the addition of fresh juice increases with the % of fresh juice added, and, as already known, decreases to zero during the storage time of 8 months at 5° C. (41° F.); iii) there is no detectable PE activity in the PEI containing juices.

The effect of PEI addition on the pectic fractions in the various cut-back samples is reported in the following table.

TABLE 2

Pectic fraction composition of Cut-Back juices after 240 days of storage at 5° C.

| Sample | % of fresh juice added | Water soluble | Sodium esametaphosphate soluble | NaOH soluble |
|---|---|---|---|---|
| 1P |  | 1030 | 210 | 320 |
| 1NP | 6.6 | 1020 | 220 | 340 |
| 1I |  | 996 | 230 | 340 |
| 2P |  | 1097 | 198 | 298 |
| 2NP | 10 | 620 | 686 | 310 |
| 2I |  | 1010 | 286 | 287 |
| 3P |  | 1066 | 257 | 386 |
| 3NP | 20 | 543 | 734 | 389 |
| 3I |  | 937 | 411 | 428 |
| 4P |  | 1000 | 270 | 407 |
| 4NP | 30 | 298 | 860 | 447 |
| 4I |  | 972 | 326 | 435 |
| 5P |  | 1008 | 412 | 448 |
| 5NP | 38 | 223 | 1052 | 407 |
| 5I |  | 978 | 462 | 417 |

Table 2 shows that cut-back juices containing fresh juice added with PEI have the same composition of the pectic fraction as the corresponding pasteurized samples. Conversely, in cut-back juices containing fresh juice with no PEI addition nor final pasteurization, the composition of the pectic fraction dramatically changes, with an increase of sodium esametaphosphate soluble pectins (calcium pectates) and with a noticeable decrease of the water soluble fraction, whereas the NaOH soluble fraction (protopectin) remains unchanged.

The same kind of observation was made when measuring the pH of the various samples. No difference between juices added with PEI and pasteurized juices was observed. Conversely, the pH of the samples only added with fresh juice was significantly lower, in some cases by as much as 0.2 units.

The above results confirm the PEI inhibitory activity on pectinesterase also for long periods and demonstrate that PEI can be as effective as the pasteurization procedure in blocking the PE activity in citrus juices.

Therefore, it is evident that the inhibitor of the present invention may be advantageously employed as an adjuvant in the production of vegetable juices and concentrates and of other fruit or vegetable products, in order to inhibit the de-esterification of pectins and to block the PE activity, so as to stabilize the cloud.

By adding the inhibitor to frozen concentrate orange juices (FCOJ), for instance, it would be possible to store these products at temperatures higher than $-18°$ C. ( 0° F.), with considerable energy savings.

It is evident, moreover, that by adding PEI to those juices and concentrates which are subject to heat treatment for their stabilization/sterilization, it would be possible to reduce the heating temperature, since, as already said, the inhibition of PE requires higher temperatures than the destruction of the bacterial flora. This reduction in the heating temperature would result in considerable energy savings and in an improvement in the organoleptic properties of the product (keeping of the natural flavors).

By way of example, the addition of PEI to tomato juices would render the hot-break procedures unnecessary.

The present invention has been disclosed with particular reference to some specific embodiments thereof, but it is clear that modifications may be brought to it by those who are skilled in the art without departing from its true spirit and scope.

We claim:

1. Protein having pectinesterase-inhibiting activity, extracted from fruit, made of a single polypeptide chain having molecular weight of 28,000 daltons.

2. Protein according to claim 1, extracted from kiwi (Actinidia chinensis).

3. Protein according to claims 1 or 2, having an isoelectric point not higher than 3.5.

4. Protein having pectinesterase-inhibiting activity, obtained by extraction from kiwi (Actinidia chinensis) according to the following procedure:

homogenization in water of the fruit pulp, centrifugation and separation of the supernatant, fractioned precipitation of said supernatant with ammonium sulfate (0–70% saturation), re-dissolution of the precipitate so obtained and dialysis thereof, fractioning by anionic exchange chromatography of the proteic dialysate obtained from the preceding step and collection of the fractions showing pectinesterase PE-inhibitory activity, concentration of the mixture obtained by combining said fractions by precipitation with ammonium sulfate and subsequent dialysis, further purification of the dialysate so obtained by Fast Protein Liquid Chromatography FPLC.

5. Protein according to claim 4 made of a single polypeptide chain having molecular weight of 28,000 daltons.

6. Protein according to claim 5 having an isoelectric point not higher than 3.5.

7. Method for stabilizing vegetable juices and concentrates, as well as other fruit or vegetable products, comprising the addition to the juice, concentrate or product of an effective amount of the PE-inhibiting protein according to any one of claims 1–6.

8. Method according to claim 7, applied to the production of fruit juices and purées.

9. Method according to claim 7, applied to the production of tomato purées and concentrates.

* * * * *